(12) United States Patent
Alexandre et al.

(10) Patent No.: US 11,058,135 B2
(45) Date of Patent: Jul. 13, 2021

(54) CITRUS PULP FIBER SYSTEMS AND GEL-BASED DESSERT SYSTEMS

(71) Applicant: CARGILL, INCORPORATED, Wayzata, MN (US)

(72) Inventors: Ben Alexandre, Eppegem (BE); Catharina Hillagonda Homsma, Bartem (BE); Linsen Liu, Irvine, CA (US); Brian Surratt, Tucker, GA (US); Joël René Pierre Wallecan, Vilvoorde (BE)

(73) Assignee: Cargill, Incorporated, Wayzata, MN (US)

( * ) Notice: Subject to any disclaimer, the term of this patent is extended or adjusted under 35 U.S.C. 154(b) by 374 days.

(21) Appl. No.: 15/161,653

(22) Filed: May 23, 2016

(65) Prior Publication Data

US 2016/0302459 A1  Oct. 20, 2016

Related U.S. Application Data

(62) Division of application No. 13/201,386, filed as application No. PCT/US2010/024015 on Feb. 12, 2010, now abandoned.

(60) Provisional application No. 61/207,699, filed on Feb. 15, 2009.

(51) Int. Cl.
| | | |
|---|---|---|
| *A23L 9/10* | (2016.01) | |
| *A23L 19/00* | (2016.01) | |
| *B27N 3/04* | (2006.01) | |

(52) U.S. Cl.
CPC ........ *A23L 9/12* (2016.08); *A23L 9/10* (2016.08); *A23L 19/07* (2016.08); *A23L 19/09* (2016.08); *A23V 2002/00* (2013.01); *B27N 3/04* (2013.01)

(58) Field of Classification Search
CPC ....... A23D 9/007; A23L 1/3006; A23L 1/308; A23L 1/3081; A23L 1/3082; A23L 1/2128; A23L 9/12; A23L 9/10; A23L 19/07; A23L 19/09; B27N 3/04; A23V 2002/00
USPC ........................................ 426/577, 616, 573
See application file for complete search history.

(56) References Cited

U.S. PATENT DOCUMENTS

| | | | |
|---|---|---|---|
| 4,413,017 | A | 11/1983 | Loader |
| 4,623,549 | A | 11/1986 | Katt et al. |
| 4,774,099 | A | 9/1988 | Feeney et al. |
| 4,865,863 | A | 9/1989 | Prosise et al. |
| 5,185,176 | A | 2/1993 | Chiu et al. |
| 5,458,904 | A | 10/1995 | Zolper |
| 5,725,899 | A | 3/1998 | Cole et al. |
| 6,503,545 | B1 | 1/2003 | Perlman et al. |
| 2003/0175400 | A1 | 9/2003 | Schlosser et al. |
| 2004/0258801 | A1 | 12/2004 | Ling et al. |
| 2005/0271790 | A1 | 12/2005 | Aronson et al. |
| 2006/0251789 | A1 | 11/2006 | Lundberg et al. |
| 2006/0280840 | A1 | 12/2006 | Robertson |
| 2011/0020525 | A1 | 1/2011 | Homsma et al. |

FOREIGN PATENT DOCUMENTS

| | | | |
|---|---|---|---|
| DE | 19943188 | A1 | 3/2001 |
| EP | 0485030 | A | 5/1992 |
| EP | 0965278 | A1 | 12/1999 |
| EP | 1692948 | A2 | 8/2006 |
| EP | 1723856 | A1 | 11/2006 |
| EP | 2230946 | | 9/2010 |
| GB | WO 2005039316 | A1 | 5/2005 |
| JP | 62036149 | A | 2/1987 |
| JP | 2000026884 | A * | 1/2000 |
| JP | 2006014629 | A | 1/2006 |
| RU | 2156594 | C1 | 9/2000 |
| RU | 2277354 | C2 | 6/2006 |
| WO | WO 2001/17376 | A1 | 3/2001 |
| WO | WO 2002/15720 | | 5/2002 |
| WO | WO 2006/033697 | | 3/2006 |
| WO | WO 2006/122734 | | 11/2006 |
| WO | WO 2007/003391 | | 1/2007 |
| WO | WO 2008/062057 | A | 5/2008 |
| WO | WO 2010/093864 | A3 | 11/2010 |

OTHER PUBLICATIONS

Sakurada et al. JP2000-026884, Jan. 2000, Machine Translation.*
PCT International Search Report PCT/US2010/024015 dated Sep. 21, 2010. 2 pages.
PCT International Search Report PCT/EP2006/006442 dated Jul. 9, 2006. 2 pages.
PCT International Search Report from corresponding PCT/US08/13579, dated Feb. 26, 2009, 1 page.
Machine Translation of Kazutoshi JP 2006-014629 (Jan. 2006).
Machine Translation of Endress DE 19943188 (Mar. 2001).
Gengiz E et al., "Changes in energy and cholesterol contents of frankfurter-type sausages with fat reduction and fat replacer addition", Food Chemistry, Jul. 1, 2005, vol. 91, No. 3, pp. 443-447, Elsevier LTD, NL.
Larrea M A et al., "Some functional properties of extruded orange pulp and its effect on the quality of cookies", Lebensmittel Wissenschaft Und Technologies, May 1, 2005, pp. 213-220, vol. 38, No. 3, Academic Press, London, GB.

(Continued)

*Primary Examiner* — Lien T Tran
*Assistant Examiner* — Tynesha L McClain-Coleman

(57) ABSTRACT

Gel-based dessert systems, e.g., pudding systems, and pre-blend systems include an edible lipid and citrus pulp fiber. One particularly useful dry mix is made by homogenizing a combination that includes citrus pulp fiber, an edible lipid, and water to form a homogenized product. The combination includes 1-20 parts by weight of the lipid for each part by weight of citrus pulp fiber. The homogenized product is then dried to form a dry blend system. It has been found that such a dry blend system can be used to replace shortenings used in puddings and the like to reduce trans and saturated fats while retaining or even improving rheology and stability of the pudding.

5 Claims, No Drawings

(56) References Cited

OTHER PUBLICATIONS

Souci et al., "Food Compositions and Nutrition Tables" 2000, Medpharm, Stuttgart, XP002395859, pp. 47, 1037.
Grigelmo-Miguel et al., "Characterization of Dietary Fiber From Orange Juice Extraction", Food Research International, vol. 31, No. 5, pp. 191-204, 1999.
Porzio et al. Washed Orange Pulp; Characterization and Properties; ACS Symposium Series, Apr. 11, 1983, pp. 191-204.
Fisher, J., "Functional Properties of Herbacel AQ Plus Fruit Fibers"; Poster presented at Dietary Fibre 2000, Dublin, May 13-18, 2000, 2 pages.
Yoshida et al., "Citrus Juice Waste as a Potential Source of Dietary Fiber", J. Japan Soc. Hort. Sci., vol. 53, No. 3, pp. 354-361. 1984.
Fisher, J., "Fruit Fibres to Improve the Nutrition", XP002608042, Innovations in Food Technology, 2007, pp. 4.
Kerry Hughes, "Reduce Fat with Pulp Fiber", XP008137836, Prepared Food Networks, [Online], retrieved from: http://www.preparedfoods.com/articles/reduce-fat-with-pulp-fiber, Jan. 1, 2007, pp. 2.

\* cited by examiner

US 11,058,135 B2

CITRUS PULP FIBER SYSTEMS AND GEL-BASED DESSERT SYSTEMS

CROSS REFERENCE TO RELATED APPLICATIONS

This application is a Divisional of U.S. patent application Ser. No. 13/201,386, filed 12 Aug. 2011, now abandoned, which claims benefit the international application PCT/US2010/24015, filed 12 Feb. 2010, which application claims priority to U.S. provisional patent application 61/207,699, filed 15 Feb. 2009, which applications are hereby incorporated by reference herein in their entirety.

FIELD OF THE DISCLOSURE

The disclosure generally relates to dry blend systems and food systems comprising citrus pulp fiber and an edible oil, and methods of use thereof in foods. The advances disclosed herein have particular utility in connection with structured fats low in trans and saturated fats and in connection with gel-based dessert systems.

BACKGROUND OF THE DISCLOSURE

Food manufacturers are continuously challenged to find ways to improve various qualities in food systems, such as improving shelf life, improving flavor, reducing calories, replacing commonly known food allergens, and keeping raw material production costs low. To attain these objectives, food manufacturers often endeavor to find substitutes to traditional materials, which can impart these qualities in a better or more efficient manner and/or provide the same qualities at a reduced cost. At the same time, however, the appetizing and authentic nature of the food systems should be sustained. Additionally, food manufacturers are also continuously searching for ways to produce naturally-sourced food systems to satisfy increasing consumer demand for healthy and natural foods. Thus, there is a continuing need to develop food systems that can achieve these desirable objectives.

Health-conscious consumers are also increasingly aware of the types of fats in food products. Some consumers try to limit saturated fat in their diet, citing concerns about increased blood serum cholesterol. Partial hydrogenation of fats having lower saturated fat levels provides the fat with plasticity similar to traditional shortenings, e.g., tropical fats such as palm oil. Unfortunately, partial hydrogenation increases the trans fat content. Recent press coverage and regulatory labeling changes in the United States have made consumers wary of trans fat, as well.

It is also well-known that current processes for making fruit juice, such as citrus fruit juice, employ extractors for separating the juice-containing inner part of the fruit (often referred to as coarse pulp, juice pulp, floating pulp, juice sacs, or pulp fibers) from its outer peel. These processes produce certain waste fruit materials, such as pulp fibers and peels. For many years, problems with the disposal of waste fruit material have prompted attempts to utilize this waste material. For example, numerous attempts have been made to employ pulp fibers in foods intended for human and/or pet consumption. Accordingly, in light of the objectives discussed above, it is desirable to explore the use of waste fruit materials, such as citrus pulp fiber, to develop food systems which can achieve the desirable characteristics discussed above.

SUMMARY OF THE DISCLOSURE

The present disclosure relates to compositions comprising citrus pulp fiber and an edible lipid; methods of making such compositions; and preblend systems, food systems, and finished food products, e.g., puddings, that include citrus pulp fiber and an edible lipid, preferably an edible liquid oil. One embodiment provides a method of forming a food product. This method involves homogenizing a combination that includes citrus pulp fiber, an edible lipid, and water to form a homogenized combination that includes 1-20 grams the lipid for each gram of citrus pulp fiber. The homogenized combination is then dried to form a dry blend system. In one useful implementation, the method further includes mixing the dry blend system with a sweetener, a starch, and, optionally, water and/or milk to form a gel-based dessert system. In one useful adaptation, the edible lipid is an edible oil comprising no more than about 2% trans fat and less than about 20% FDA saturates (defined below).

Another aspect provides a dry blend system comprising citrus pulp fiber and an edible oil. The edible oil has a solid fat content of no greater than 5 weight percent (wt %) at 0° C. This dry blend system has been prepared by homogenizing a combination that includes water, the citrus pulp fiber, and 1-20 grams of the edible oil per gram of the citrus pulp fiber, then drying the homogenized combination.

One further embodiment provides a method of making a gel-based dessert system, e.g., a finished pudding. Citrus pulp fiber, an edible lipid, and water are homogenized to form a preblend system. Thereafter, at least a portion of the preblend is mixed with a sweetener and a starch, e.g., an edible starch. In one implementation of this process, the preblend system is dried to form a dry blend system and the step of mixing at least a portion of the preblend system comprises mixing the dry blend system with the other ingredients. In an alternative implementation, the preblend system is not dried, but instead retains the water used in forming the preblend system.

Still another embodiment provides a gel-based dessert product that includes a structured fat component, water, and an edible starch. The structured fat component comprises citrus pulp fiber and an edible oil and it has a solid fat content of no greater than 5 wt % at 0° C. The gel-based dessert product may be devoid of hydrogenated lipids and have an FDA saturates content of no more than 20%, e.g., less than 15%, of the total fat content of the gel-based dessert product.

One further embodiment constitutes a method of making a gel-based dessert system that is a dry blend system. This method includes forming an emulsion that comprises citrus pulp fiber, water, and an edible oil having a solid fat content of no greater than 5 wt % at 0° C. The emulsion is contacted with a second component that comprises at least one of a sweetener and a starch. The emulsion and second component are dried to a combined water content of no more than 10 wt %.

DESCRIPTION OF THE EMBODIMENTS

As noted above, the present disclosure sets forth a variety of methods and compositions that utilize citrus pulp fiber and an edible lipid. Before detailing those aspects of the disclosure, though, it is useful to clarify the meanings of some of the terms used in the following description.

Selected Definitions

As used herein, the term "dry blend system" is understood to mean a system comprising about 90 to 100% dry ingredients (e.g., particulates, powders and the like) and 0 to about 10% moisture.

As used herein, the term "food system" is understood to mean systems comprising food products and beverages intended for human and/or pet consumption. A food system can comprise a mixture of all the ingredients of a particular food product prior to the processing steps which results in the finished food product.

As used herein, the term "preblend system" is understood to mean a system a subset of ingredients present in a food system. The preblend system may be a dry blend system or may include more than 10% moisture; in some useful embodiments, the preblend includes more than 50% water.

As used herein, the term "gel-based dessert system" encompasses dry blend systems that are useful in making gel-based desserts, food systems that are mixtures of most or all of the ingredients for gel-based desserts, and finished gel-based dessert products. Gel-based dessert products include puddings such as traditional milk-based puddings, other dairy-based gel products such as yogurt and custards, and non-dairy counterparts, such as non-dairy puddings or soy yogurt.

As used herein, the term "citrus pulp fiber" and its grammatical derivatives is understood to mean fiber derived from the juice-containing inner part of citrus fruits, which is often referred to as coarse pulp, juice pulp, floating pulp, juice sacs, or pulp fibers. Citrus pulp fiber suitable for use herein can be derived from any citrus fruit including, but not limited to, oranges, tangerines, limes, lemons, grapefruits, and mixtures thereof. In an aspect, the citrus pulp fiber can be derived from orange fruit of any variety, for example Valencia oranges, Early/Mid-Season oranges, blood oranges, or mandarin oranges.

As used herein, the term "Valencia orange" or "Valencia orange fruit" refers to orange fruit from the genotype or variety Valencia, which usually mature relatively late in the harvest season as compared with other citrus fruit, e.g., orange fruit generally maturing during the months of March through June. Examples of Valencia orange fruit include, but are not limited to, Florida Valencia orange fruit, California Valencia orange fruit, and Brazilian Valencia orange fruit. As used herein, the term "Early/Mid-Season orange" or "Early/Mid-Season orange fruit" ("E/M") refers to orange fruit which usually mature during the early to middle part of the harvest season, e.g., orange fruit generally maturing during the months of October through February. Examples of Early/Mid-Season orange fruit include, but are not limited to, Florida Early/Mid-Season oranges (such as the Hamlin, Parson, Brown, and Pineapple varieties), Brazilian Early/Mid-Season orange fruit (such as the Pera Rio and Natal varieties), and California Early/Mid-Season orange fruit (such as the California Navel variety).

As used herein, the term "replace" and its grammatical variations is understood to mean using the disclosed preblend system comprising citrus pulp fiber to replace all or some solids (e.g., lipids, proteins, and/or carbohydrates) in a food system, where citrus pulp fiber performs the functional roles of said replaced solids. Without being limited by theory, it is thought that the functionality for each and/or all of the replaced solids in a food system is mimicked by the preblend system comprising citrus pulp fiber. The disclosed preblend system is thought to provide similar and consistent organoleptic properties in a food system, where such properties are traditionally supplied by the replaced solids. In this way, the disclosed preblend system can restore the functional requirements (often in a lesser amount compared to the replaced solids) in a food system, due to the unique properties linked with the disclosed preblend system. Similarly, the ability of the disclosed preblend system to mimic functionalities allows manufacturers to reduce costs and/or offer cleaner ingredient declarations.

As used herein, the term "devoid" and its grammatical variations is understood to mean containing at most trace amounts of a substance (e.g., less than 0.5 wt. %).

As used herein, the term "synergy" and its grammatical variations refer to the interaction of elements that, when combined, produce a total effect greater than the sum of the individual elements.

The U.S. Food and Drug Administration defines saturated fatty acids as the sum of lauric (C12:0), myristic (C14:0), palmitic (C16:0) and stearic (C18:0) acids; as used herein, the term "FDA saturates" means this sum. Unless total saturate content is specified, the saturated fatty acid values expressed here include only "FDA saturates". All fatty acid percentages and trans fat percentages herein are percent by weight of the total fatty acid content. The fatty acid content of the oil may be determined in accordance with American Oil Chemists' society method AOCS Ce1c-89.

Citrus Pulp Fiber

A variety of citrus pulp fibers are commercially available, including a line of food grade products available from Fiberstar, Inc. of Wilmar, Minn., USA (http://www.fiberstar-.net/) under the trade name CITRI-FI, e.g., CITRI-FI 100 and CITRI-FI 100M40. In one implementation, citrus pulp fiber can be extracted by the processes described in United States Patent Application Publication No. US 2006/0115564, entitled "PROCESS OF EXTRACTING CITRUS FIBER FROM CITRUS VESICLES", the entirety of which is incorporated herein by reference.

Some preferred embodiments utilize citrus pulp fibers that have a water binding capacity of from about 7 g of water to about 25 g of water per gram of citrus pulp fiber, and an oil binding capacity of from about 1.5 g of oil to about 10 g of oil per gram of citrus pulp fiber. The water binding capacity of the citrus pulp fibers can be measured by preparing samples in double and averaging the results to arrive at the final result, according to the following procedure: 0.5 g of the fiber (dry powder) can be placed into a 50 mL centrifuge tube and weighed (noted as W1). Then 40 g of milli-Q water (noted as W2) can be added. The tube can then be closed and stirred by hand for one minute. The tube can be submitted to centrifugation for five minutes at 2000 rpm, and the supernatant can then be decanted and weighed (noted as W3). The water binding capacity (WBC) of the fibers can be calculated by the following formula: $WBC=(W2-W3)/W1$. The WBC is expressed as grams of water per gram of fiber (g water/g fiber).

The oil binding capacity of the citrus pulp fibers can be measured by centrifuging 5% powder dispersion and weighing the precipitate. Samples can be prepared and measured according to the following procedure: 2.5 g of powdered fiber (noted as W1) can be dispersed in 50 g of standard quality soya oil (noted as W2) in a 300 mL beaker. The samples can be stirred for 10 minutes at about 500 rpm until the fibers are completely dispersed. The samples can be left for 30 minutes until they are adapted to the hydrophobicity. The samples can be stirred again after adapting, and 45 g of the sample can be transferred to a centrifuge tube. The weight of the tube can be noted as W3, and the total weight of the centrifuge tube with the sample can be noted as W4.

The tubes containing the sample can be centrifuged for five minutes at 3800 rpm, the supernatants decanted, and the centrifuged tubes containing the precipitated weighed (noted as W5).

The oil binding capacity (OBC) of the fibers can be calculated by the following formula: $OBC=W_{co}/W_{cp}$, where $W_{cp}$ can be calculated as $W_{cp}=(W_p/100)\times(W4-W3)$, and $W_{co}$ can be calculated as $W_{co}=W5-W3-W_{cp}$. $W_p$ (percent of product in sample dispersion) can be calculated as $W_p=W1\times 100/(W1+W2)$. $W_o$ (percent of oil in sample dispersion) can be calculated as $W_o=W2\times100/(W1+W2)$. The OBC is expressed as grams of oil per gram of fiber (g oil/g fiber).

Edible Lipids

The disclosed preblend system also includes an edible lipid. Any edible lipid can be used in the present disclosure. Suitable lipids include, but are not limited to, vegetable oils and fats, lauric oils and fats, milk fat, animal fats, marine oils, partially digestible and nondigestible oils and fats, surface-active lipids, and mixtures thereof. Useful vegetable oils and fats include, but are not limited to, triacylglycerols based on $C_{18}$ unsaturated fatty acids, such as oleic acids, linoleic acids, and mixtures thereof. Non-limiting examples of useful unhydrogenated, partially hydrogenated, and fully hydrogenated vegetable oils include oils derived from rapeseed (e.g., canola), soybeans, safflowers, olives, corn, maize, cotton seeds, olives, palm, peanuts, flaxseeds, sunflowers, rice bran, sesame, cocoa butter, and mixtures thereof. Useful lauric oils and fats include, but are not limited to, triacylglycerols based on lauric acid comprising 12 carbon atoms. Non-limiting examples of useful lauric oils and fats include coconut oil, palm kernel oil, babassu oil, and mixtures thereof. Non-limiting examples of useful animal fats include lard, beef tallow, egg lipids, intrinsic fat in muscle tissue, and mixtures thereof. Non-limiting examples of useful marine oils include triacylglycerols based on Ω-3 polyunsaturated fatty acids, such as docosahexanoic acid, menhaden oil, herring oil, and mixtures thereof.

Partially digestible and nondigestible oils and fats can be useful in certain applications because they impart little or no calories to a food system and can impart a hypocholesterolemic capability to foods that incorporate said fats and oils. Non-limiting examples of such fats and oils include polyol fatty acid polyesters, structured triglycerides, plant sterols and sterol esters, other nondigestible lipids such as esterified propoxylated glycerin (EPG), and mixtures thereof. Examples of useful plant sterols and esters include but are not limited to sitosterol, sitostanol, campesterol, and mixtures thereof. Examples of partially digestible and nondigestible oils and fats that can provide food systems with a hypocholesterolemic capability include but are not limited to sucrose polyesters, such as those sold under the trade name of Olean® by the Procter & Gamble Company of Cincinnati, Ohio.

Conventional puddings typically employ plastic fats, such as vegetable shortening, to provide a desirable rheology and mouth feel to the pudding. Plastic fats have relatively high solid fat content (SFC), with the crystalline solid fat providing structure and plasticity. The solid fat content will vary with temperature, but a plastic fat may be generally defined as a fat having a SFC of 10-30 wt % at the relevant temperature. Typical all-purpose bakery shortenings, for example, commonly have a SFC of about 12 wt % at 30° C. and a SFC of about 30 wt % at about 15° C., meaning that they are plastic at about 15-30° C. At refrigeration temperatures, the SFC would be higher than 30 wt %. Conventional roll-in shortenings of the type used to make Danish pastries and the like have even higher SFC levels than all-purpose shortenings, with a plastic temperature range closer to 25-40° C. and SFCs at 10° C. approaching 50 wt %.

Unfortunately, conventional vegetable shortenings tend to be high in trans fats and/or saturated fats. For example, many vegetable shortenings are formed by partially hydrogenating vegetable oils that are liquid at room temperature, such as soybean oil or cottonseed oil. The process of partially hydrogenating the oil creates both saturated fats and trans fats, with most conventional partially hydrogenated vegetable shortenings containing over 25%, typically 30% or more, trans fats (i.e., over 25 wt %, typically 30 wt % or more, of the fatty acids in the oil have at least one double bond in a trans configuration). The saturated and trans fats provide the solid fat content necessary to provide the desired degree of plasticity. If a food product manufacturer in the United States wants to indicate on the product label that the product has 0 g of trans fat per serving (often called "trans-free"), though, the high levels of trans fat limits the amount of partially hydrogenated vegetable shortening included in the product.

To reduce trans fats, vegetable shortenings can instead be made using tropical oils such as palm oil and coconut oil. These fats are high in saturated fat, with palm oils typically containing at least 50% FDA saturates (i.e., at least 50 wt % of the fatty acids in the oil are FDA saturates, as defined above) and coconut oil typically containing more than 90% FDA saturates. Some manufacturers also employ fully hydrogenated oils, such as fully hydrogenated soybean oil, to increase saturates without driving up trans fat content. Using such fats to provide plasticity minimizes trans fat content, but increases the saturated fat content of the finished food product Because the US and other countries require food labels to state the saturated fat content of the food, using these vegetable shortenings can also adversely impact consumer acceptance.

As explained below, some embodiments of the disclosed preblend systems can provide a structured fat system with little or no trans fats and relatively low saturated fat content. In such embodiments, the preblend system may employ an edible liquid oil, preferably a non-hydrogenated liquid oil. This liquid oil may be substantially free of solid fat at 25° C., i.e., have a solid fat content at 25° C. ("SFC 25") of approximately 0 wt %, and a solid fat content at 0° C. ("SFC 0") of no more than about 5 wt %, desirably less than 2%. Many suitable oils are substantially free of solid fat at 0° C., i.e., have a SFC 0 of approximately 0 wt %. Solid fat content may be measured using nuclear magnetic resonance in accordance with American Oil Chemists' Society method AOCS Cd 16b-93.

The edible liquid oil in the disclosed preblend system may also have a relatively low Mettler Dropping Point (MDP). Many edible lipids contain a variety of triacylglycerols and do not have a single, clearly defined melting point. The MDP, which may be thought of as the temperature at which a solid fat becomes fluid to flow, is measured in accordance with American Oil Chemists' Society method Cc 18-80. In some advantageous implementations of the disclosed preblend system, the disclosed preblend system includes edible oil having an MDP of less than 10° C., preferably no greater than 5° C., e.g., 0° C. or less.

In certain useful embodiments, the oil used in the preblend system is a non-hydrogenated oil low in both trans fats and saturated fats. Many commercially produced vegetable oils will have trace amounts of trans fats that are generated during the process of refining, bleaching, and deodorizing crude vegetable oils, so the oil may not be completely free of trans fat. In one embodiment, the trans fat content is no greater than 5%, e.g., no greater than 3% or no greater than 2%. The FDA saturates of the oil in such a preblend system is desirably less than 30%, desirably no greater than 20%, preferably no greater than 15%.

Suitable oils for producing such lower trans- and saturated-fat preblend systems include, but are not limited to, non-hydrogenated and/or lightly hydrogenated rapeseed oil (e.g., canola oil), soybean oil, sunflower oil, safflower oil, corn oil, cottonseed oil and peanut oil. Specialty canola, soybean, and sunflower oils that have elevated oleic acid levels and/or reduced linolenic acid levels are very useful in preparing gel-based dessert systems that require longer shelf life; CLEAR VALLEY 65 and CLEAR VALLEY 75 brand canola oils (Cargill, Incorporated of Wayzata, Minn., USA, referred to below as "Cargill") are deemed particularly well-suited for such applications. These oils may be used alone or in combination, such as using both rapeseed oil and cottonseed oil in the preblend system. To improve stability or functional characteristics, the edible oil used in forming the preblend system may also include a hydrogenated oil, such as fully hydrogenated soybean oil, at an addition level that will leave the preblend system with the desired trans- and saturated-fat content.

Conventional wisdom suggests that the oil used to prepare gel-based dessert systems, especially puddings, should be a shortening or the like that has a relatively high solid fat content, e.g., an SFC 25 of 10 wt % or more. That same wisdom suggests that using a liquid oil, e.g., one having an SFC 0 of less than 5 wt %, will yield a gel-based dessert system with questionable viscosity and texture and with reduced stability. Unexpectedly, the disclosed preblend systems using such a liquid oil produce gel-based dessert systems having similar stability and higher viscosity than comparable conventional compositions employing shortening.

In situations where lipids also act as emulsifiers, the disclosed preblend system can be useful as a lipid (emulsifier) substitute, without compromising desirable properties. Thus, in an aspect, the disclosed preblend system can be used as substitutes for a system comprising such lipids including, but not limited to, lecithin, polysorbate, partially hydrogenated oils, and mixtures thereof. Accordingly, the disclosed preblend system can replace all or some of the lipid solids used in various food systems, thereby reducing the solids content present therein.

Optional Components of the Preblend System

Preblend systems in accordance with this disclosure may include any number of optional ingredients that are useful in forming a desired finished food product. As explained below, the disclosed preblend system may be a dry blend system or a wet blend system that includes more than 10% moisture. Such a wet blend system may include more than 20% water, e.g., 40-99% water. More generally, the disclosed wet blend system may include a liquid system that can be one or more of water, water miscible liquids, water immiscible liquids, and microemulsions. Non-limiting examples of water miscible liquids include milk; milk protein containing liquids, such as cream, buttermilk, whey, and yogurt; ice cream; soy milk based liquid; alcohol containing liquid; and mixtures thereof. Non-limiting examples of water immiscible liquids include hydrophobic, lipid-based liquids, such as vegetable oil, cocoa butter, oils derived from rice bran, and mixtures thereof.

As used herein, "microemulsions" is understood to mean a dispersion of two immiscible liquids (one liquid phase "dispersed" and the other being "continuous") in which the individual droplets of the dispersed phase have an average radius of less than about % of the wavelength of light, for example less than about 1,400 Å. In an aspect, the microemulsion can comprise oil and water. In another aspect, the wet system can further comprise at least one additive selected from the group consisting of electrolytes, trace elements, fats, flavoring agents, antioxidants, edible acids, vitamins, minerals, buffering salts, colorants, preservatives, emulsifiers, sweeteners, and mixtures thereof.

In other aspects, the disclosed preblend system may include one or more of sweeteners and/or other carbohydrates, dairy or egg products, emulsifiers, and other additives. Suitable examples of sweeteners include, but are not limited to, monosaccharides, disaccharides, oligosaccharides, polysaccharides, sugar alcohols, and mixtures thereof. For instance, useful monosaccharides can include tetroses, such as erythrose; pentoses, such as arabinose, xylose, and ribose; hexoses, such as glucose (dextrose), fructose, galactose, mannose, sorbose, and tagatose; and the like. As another example, useful disaccharides can include sucrose, maltose, trehalulose, melibiose, kojibiose, sophorose, laminaribiose, isomaltose, gentiobiose, cellobiose, mannobiose, lactose, leucrose, maltulose, tumanose, and the like. Suitable sweeteners also include nutritive and non-nutritive high-intensity sweeteners, e.g., saccharin, aspartame, sucralose, acesulfame potassium, stevia glycosides, and monatin.

The disclosed preblends may include carbohydrates other than sweeteners, such as other digestible, partially digestible, and nondigestible polysaccharides. Non-limiting examples of useful digestible polysaccharides include glycogen; starches that are derived from rice, corn, maize, barley, soybeans, sunflower, canola, wheat, oats, rye, potato, and cassava; maltodextrin obtained by the partial hydrolysis of starch; and mixtures thereof. Suitable types of starches can be native, unmodified starches; pre-gelatinized starches: chemically modified starches; high amylase starches; waxy starches; mixtures thereof; and the like.

Useful nondigestible polysaccharides can be water-soluble or water-insoluble. Non-limiting examples of water-soluble and predominately water-soluble, nondigestible polysaccharides include oat bran, barley bran; psyllium; pentosans; plant extracts such as pectins, inulin, and beta-glucan soluble fiber; seed galactomannans such as guar gum and locust bean gum; plant exudates such as gum arabic, gum tragacanth, and gum karaya; seaweed extracts such as agar, carrageenans, alginates, and furcellaran; cellulose derivatives such as methylcellulose, carboxymethyl cellulose, and hydroxypropyl methylcellulose: microbial gums such as xanthan gum and gellan gum; hemicellulose; polydextrose; and mixtures thereof. Non-limiting examples of suitable water-insoluble and predominantly water-insoluble nondigestible polysaccharides include cellulose, microcrystalline cellulose, brans, resistant starch, and mixtures thereof.

In an embodiment, the disclosed preblend system can demonstrate synergy with carbohydrates, such that the combined total effect in a food system is greater than the sum of the effect of the carbohydrate alone or the preblend system devoid of carbohydrate in a food system. For example, a preblend system comprising citrus pulp fiber and at least one carbohydrate can be used in a food system, wherein the citrus pulp fiber and carbohydrate synergistically act to improve functionality including, but not limited to, emulsion stability, reduced syneresis, increased oil binding capacity, and the like. Non-limiting examples of food systems in which the disclosed preblend system can demonstrate synergy with carbohydrates include, but are not limited to, gel-based dessert systems such as dairy and non-dairy puddings, custards, and yogurts. In one useful implementation, the citrus pulp fiber can synergistically act with carbohydrates, such as an n-octenyl succinate (nOSA) starch, to improve functionality.

In situations where carbohydrates also act as emulsifiers, the disclosed preblend system can be useful as a carbohydrate (emulsifier) substitute, without compromising desirable properties. Thus, in an aspect, the disclosed preblend system can be used as substitutes for systems comprising such carbohydrates including, but not limited to carboxy methylcellulose, sodium stearoyl lactlyate, mono- and diglycerides, and mixtures thereof. Accordingly, the disclosed dry blend system can replace all or some of the carbohydrate solids used in various food systems, thereby reducing the solids content present therein.

In an aspect, the disclosed preblend system can comprise dairy products, such as cream, whole milk, buttermilk, skim milk, nonfat milk solids, whey, whey protein concentrate, whey protein isolate, and mixtures thereof. Such dairy products are particularly useful in making dairy pudding systems and other dairy gel-based dessert systems. Other suitable dairy or egg products include dairy proteins, e.g., milk proteins, and egg proteins, which can provide a variety of functions including, but not limited to, texturizing, emulsifying, and providing nutritional value. The dairy proteins may be derived from the dairy products enumerated above. Non-limiting examples of suitable milk proteins include, but are not limited to, caseinates, such as sodium caseinate, calcium caseinate, and paracaseinate (rennet casein); and whey proteins, such as beta-lactoglobulin and alpha-lactalbumin. The egg proteins can be derived from any avian egg, including but not limited to chickens, ducks, and geese. Non-limiting examples of suitable egg proteins include, but are not limited to liquid egg white proteins, liquid egg yolk proteins, and egg protein powders.

The disclosed preblend system can also replace the amount of dairy and egg protein solids used in a food system. In an embodiment, the disclosed preblend system can be advantageously used to effectively replace all or some of a food system comprising caseinates and/or traditional, synthetic emulsifiers. As a non-limiting example, the disclosed preblend system can advantageously be incorporated into a gel-based dessert system to provide suitable stability and emulsification, without the use of caseinates or with a reduced amount of caseinates. In addition, the disclosed preblend may provide thermal stability to gel-based dessert systems during heat treatments.

Preblends of the disclosure may also include one or more emulsifiers. Food emulsifiers have long been used in processed foods containing fats and oils to stabilize water and oil emulsions. Water and oil emulsions can be broadly categorized into two types: oil-in-water (o/w) emulsions, such as milk, ice cream, and some puddings, where oil is the dispersed phase and water the continuous phase; or water-in-oil (w/o) emulsions, such as margarine and butter, where water is the dispersed phase and oil the continuous phase.

Emulsions are not thermodynamically stable and can break down in a variety of ways. The particles can recombine or coalesce (breaking and coalescence), ultimately returning to the original two immiscible phases. In other situations, the emulsion can undergo phase inversion, whereby the oil and water change places so that an o/w emulsion becomes a w/o emulsion. Another form of emulsion instability happens where the particles retain their identities but become non-uniformly distributed in the container. This can happen either by flocculation, where particles cluster together and form clumps, or by creaming, where the density difference between the particles and the continuous phase causes gravitational separation. Whatever the mechanism, emulsion instability can disturb and damage a food system.

Emulsifiers reduce surface tension between the two immiscible phases due to their molecular structure. Emulsifiers have both a polar group with an affinity for water (hydrophilic) and a non-polar group with an affinity for oil (lipophilic). The presence of both regions on an emulsifier molecule allows it to orient itself at the phase interface and lower the interfacial energy that leads to emulsion instability. Generally, traditional, synthetic food emulsifiers can be partial esters of fatty acid and polyols, and/or water soluble organic acids. Non-limiting examples of traditional food emulsifiers include propylene glycol esters of fatty acids, polyglycerol esters of fatty acids, polysorbates, mono- and diglycerides (MDG), lecithin, and sodium stearoyl lactylate. Hydrocolloids and protein, such as gelatin, egg proteins, and dairy proteins, can also be used as emulsifiers.

However, at least one disadvantage of using traditional, synthetic emulsifiers arises due to governmental food regulations and/or religious practice limitations which ban specific additives in certain food systems. For example, sodium stearoyl lactylate is not permitted in dairy creamer food systems under Canadian regulations. As another example, gelatins are not permitted in food systems under kosher food practices. Thus, a material which functions like an emulsifier but does not encounter these types of limitations can be widely useful as an emulsifier substitute, thereby allowing market penetration into various culturally and regulatory food restrictive market segments. Moreover, such an emulsifier substitute material which is sourced from natural materials can be used to produce naturally-sourced food systems to satisfy increasing consumer demand for healthy and natural foods.

In an aspect, the disclosed preblend system can possess similar functional characteristics as a preblend system comprising traditional, synthetic and natural emulsifiers. Without intending to be limited by theory, it is believed that citrus pulp fibers possess both hydrophilic and lipophilic regions and can thereby act as emulsifiers. Accordingly, the disclosed preblend system comprising citrus pulp fiber (which is sourced from natural materials) can be used to produce naturally sourced food systems to satisfy increasing consumer demand for healthy and natural foods.

For example, the disclosed preblend system can effectively replace some or all of the traditional, synthetic and natural emulsifiers in a wide variety of food systems including, but not limited to, gel-based dessert systems. One commercially promising implementation is a pudding system that is devoid of any added emulsifier, especially a pudding system that is devoid of any synthetic emulsifier.

In another aspect, a dry blend system comprising citrus pulp fiber, an edible lipid, and lecithin can synergistically improve the emulsion functionality discussed above. Without intending to be limited by theory, it is believed that the presence of hydrophilic and lipophilic regions on citrus pulp fibers contributes to competition at the phase interface between the citrus pulp fiber and emulsifier, thereby producing a functionality greater than that predicted by the separate effects of the individual agents.

The disclosed preblend system can also comprise a hydrocolloid. Any hydrocolloid can be used in the presently disclosed preblend system. As used herein, "hydrocolloid" is understood to mean any hydrophilic colloidal material, which absorbs water, thus increasing viscosity. A hydrocolloid can impart smoothness and body texture to food systems. Suitable hydrocolloids include, but are not limited to, plant-derived gums, such as plant exudates, plant seed gums, plant cereal grains, mannan gums, pectins, and seaweed extracts; fermentation gums; animal products; and mixtures thereof. As an example, hydrocolloids used in hydrocolloid confectionery can include agar, alginates, xanthan gum, gellan gum, carob bean gum, gum arabic, pectin, gelatin, carrageenan, konjac gum, starch derivatives, and mixtures thereof.

As another example, hydrocolloids that can form thermoreversible gels or contribute to the formation of thermo reversible gels can be useful. Such hydrocolloids include, but are not limited to, kappa-carrageenan, iota-carageenan, xanthan gum, gellan gum, and mannan gums (such as locust bean gum (LBG), konjac gum, tara gum, and cassia gum.) As used herein, "contribute to the formation of thermoreversible gels" is understood to mean gums that may not form thermoreversible gels individually but can form thermoreversible gels when combined with another hydrocolloid, such as carageenan. As a further example, gums that do not form thermoreversible gels can also be useful hydrocolloids. Such hydrocolloids include dextrins (such as maltodextrin), proteins, gum arabic, and polyvinylpyrrolidone.

In an embodiment, the disclosed preblend system can demonstrate synergy with hydrocolloids, such that the combined total effect in a food system is greater than the sum of the effect of the hydrocolloid alone or the preblend system devoid of hydrocolloid in a food system. For example, a preblend system comprising citrus pulp fiber, an edible lipid, and at least one hydrocolloid can be used in a food system, wherein the citrus pulp fiber and hydrocolloid synergistically act to improve functionality including, but not limited to, emulsion stability, reduced syneresis, increased oil binding capacity, and the like. As an example, a preblend system comprising citrus pulp fiber, an edible oil, and at least one hydrocolloid can synergistically improve the viscosity and suspension functional characteristics described above in a gel-based dessert system.

In a further aspect, the disclosed preblend system can also replace plastic fat content in food systems including, but not limited to, gel-based dessert systems. For example, and as discussed below, the disclosed dry blend system can effectively replace all or some of the shortening present in pudding products while achieving desired organoleptic properties, finished product performance, and consumer acceptability.

Various agents, such as hydrocolloids, lipids, carbohydrates, and proteins, are included in food systems to provide a multitude of desirable properties, such as stability, emulsification, shear tolerance, acid tolerance, water absorption, thickening, acidulation, suspension, and the like. However, by decreasing or eliminating the amount of certain agents used (e.g., emulsifiers, fats, proteins, etc.) the disclosed preblend systems can reduce the solids content present in food systems, or replace certain solids in food systems.

Optionally, the disclosed preblend system can further comprise one or more additives to improve the flavor, color, texture, appearance, nutrition and/or other properties of the dry blend system. Non-limiting examples of such additives include, but are not limited to, electrolytes, trace elements, flavoring agents, antioxidants, edible acids, vitamins, minerals, buffering salts, colorants, preservatives, and mixtures thereof. When used in any embodiment, such additives are added in effective amounts.

As used herein, the term "edible acid" is understood to mean any water soluble acid material having a $pK_a$ of less than about 5 that is safe for ingestion by humans. Examples of edible acids include, but are not limited to, citric acid, ascorbic acid, malic acid, succinic acid, adipic acid, gluconic acid, tartaric acid, fumaric acid, phosphoric acid, monopotassium phosphate, and mixtures thereof.

Examples of suitable electrolytes include, but are not limited to, sodium, potassium, chloride, calcium, magnesium, and mixtures thereof. In an embodiment, trace elements can be included, such as chromium, copper, selenium, iron, manganese, molybdenum, zinc, and mixtures thereof.

Non-limiting examples of suitable flavoring agents include natural and synthetically prepared flavoring agents, non-caloric sweeteners, bracers, and flavanols. As used herein, the term "flavoring agent" encompasses seasonings and spices. Any natural or synthetic flavoring agent can be used in the present disclosure, such as sweet flavors, fruit flavors, natural botanical flavors, savory flavors, and mixtures thereof. Savory flavors include, but are not limited to, grain-based flavors, spice-based flavors, and buttery-type flavors. Sweet flavors include, but are not limited to, chocolate, praline, and caramel. Non-limiting fruit flavors include apple, citrus, grape, raspberry, cranberry, cherry, and the like. These fruit flavors can be derived from natural sources such as fruit juices and flavor oils, or else be synthetically prepared. Non-limiting natural botanical flavors include aloe vera, ginseng, gingko, hawthorn, hibiscus, rose hips, chamomile, peppermint, fennel, ginger, licorice, lotus seed, schizandra, saw palmetto, sarsaparilla, safflower, St. John's Wort, curcuma, cardamom, nutmeg, cassia bark, buchu, cinnamon, jasmine, haw, chrysanthemum, water chestnut, sugar cane, lychee, bamboo shoots, and the like. The flavoring agents can be available as concentrates, extracts, or in the form of synthetically produced flavoring esters, alcohols, aldehydes, terpenes, sequiterpenes, and the like.

Methods of Making a Preblend

The disclosed preblend systems can be prepared by any manner known to those skilled in the art. For example, the ingredients of the preblend system can be physically mixed together to produce a dry or wet blend system. As highlighted below, food systems that incorporate lipid and citrus pulp fiber in accordance with this disclosure can exhibit improved functionality (e.g., viscosity) over systems that omit citrus pulp fiber even if the food system is prepared by separately adding the lipid and the citrus pulp fiber.

Certain useful aspects of the disclosure provide preblend systems with substantially improved functionality by homogenizing and/or forming an emulsion comprising an edible lipid, citrus pulp fiber, and water. In some implementations, this preblend system is used in preparing a more complete food system with a majority or all of the water intact. In other implementations, this preblend system is dried to create a dry blend system.

In one aspect, the disclosed preblend systems may be formed by homogenizing a combination that includes an edible lipid, citrus pulp fiber, and water. As noted below, homogenization using at least one of high-pressure valve homogenization and high-shear homogenization can form an emulsion that may be beneficial. If so desired, though, these or any other known homogenization techniques may be used without forming an emulsion.

The lipid, citrus pulp fiber and water may be mixed in any desired proportions that yield the desired functionality in the preblend system. Exemplary embodiments that employ a liquid oil (e.g., SFC 0 of no more than 5 wt %) may have between about 0.5 and about 20 parts by weight of oil for each part by weight of citrus pulp fiber, i.e., having a weight ratio of oil to citrus pulp fiber of about 0.5 to about 20. In some aspects, the weight ratio of lipid to citrus pulp fiber may be no more than 20, e.g., no more than 19, no more than 15, or no more than 10. In forming a preblend system for use in a gel-based dessert system, weight ratios of lipid to citrus pulp fiber of 1-20, e.g., 2-15 or 2-10, should be satisfactory for a wide range of useful food products. (In comparing the relative weights of oil and citrus pulp fiber and in calculating these weight ratios, the weight of the citrus pulp fiber is on a dry basis.)

As noted above, the homogenized combination used in forming the disclosed preblend system may also include water. This water may be added as water, e.g., filtered water, or may instead be added as part of a liquid system that includes water, e.g., milk or the like.

The water content of the homogenized combination may be varied within a fairly wide range. If the homogenized combination is intended for use as a wet blend system, the water content in the preblend system may be sufficient to make up the entire water needs of the finished food composition. As explained below, it may be advantageous if the homogenization forms an emulsion, e.g., a water-in-oil emulsion. In such an embodiment, the water content may be chosen to form an emulsion that will be stable long enough to allow the preblend system to be further processed, e.g., by mixing with other ingredients to form a further preblend system or a food system that includes most or all of the ingredients of the finished food product. In certain useful embodiments, the homogenized composition may comprise about 40-99 wt % water, e.g., 75-95 wt % water. One useful wet preblend system comprises 80-98 wt % water, such as 84-98 wt %, 84-92 wt %, 85-98 wt %, or 85-92 wt % water. The preceding discussion noted that the disclosed wet blend systems may use a liquid system that includes water, water miscible liquids, and/or microemulsions. In calculating the water content of such a preblend system, the weight of water present in the preblend system may be taken as the weight of water in the water miscible liquids and/or microemulsions rather than the entire weight of the water miscible liquids and/or microemulsions.

Instead of being expressed as the weight percent of the homogenized composition, the water content in the homogenized composition may be expressed as a weight ratio of water to citrus pulp fiber. In some embodiments, the weight ratio of water to citrus pulp fiber in the preblend may be between 40 and 99, e.g., 75-95.

The homogenized composition may be homogenized in a variety of ways. Preferably, the homogenization is sufficient to form an emulsion, e.g., a water-in-oil emulsion. High-pressure valve homogenization (HPVH) has been found effective in creating a suitable emulsion. Suitable HPVH operating pressures will vary based on the valve design employed, the specific composition being homogenized, and the like, but those skilled in this area can readily determine appropriate operating conditions to form a suitably stable emulsion for the intended use. Those skilled in the art will also appreciate that high shear mixing and other techniques conventionally employed in making emulsions may also be adapted for use in homogenizing the lipid, citrus pulp fiber, and water to form the disclosed preblend system.

As mentioned previously, the disclosed preblend system may optionally included an added emulsifier, e.g., lecithin or sodium stearoyl lactylate, to improve the disclosed food system and finished food products made using the disclosed food system. If the food system is to include an emulsifier, adding the emulsifier to the homogenized composition may yield a more stable homogenized emulsion.

Some embodiments provide a preblend system that is at least partially dried after homogenization. Drying can both reduce shipping costs and reduce water activity in the preblend; lower water activity contributes to greater storage stability. In a commercially useful implementation, the homogenized composition is dried to a moisture content of less than 15%, preferably no greater than 10% to form a dry blend system.

The initial wet blend system may be dried in a variety of ways. For example, freeze drying and fluidized bed drying have been found to yield dry blend systems with surprisingly beneficial functionality.

In one useful implementation, the homogenized composition is dried in the presence of a second component that may comprise at least one further ingredient that is not in the homogenized composition. In some circumstances, the homogenized composition may be contacted with the second composition during the drying. The second component may comprise a dry blend system including one or more ingredients, but it could instead have a higher moisture content.

The nature and composition of this second component will depend on the nature of the food system in which the disclosed dry blend system will be used. The second component may include any of the optional ingredients noted above. For example, a dry blend system for making a gel-based dessert may include a second component that comprises at least one of a starch and a sweetener. In Example 3 below, for example, the second component comprises modified starch. Using a starch and a sweetener, e.g., a modified starch and sucrose, as the second component in this drying process yields a dry blend system that can reduce or eliminate the need for other starches and sweeteners in making the final food system.

In general, freeze drying involves freezing the material then sublimating the water under low pressure. Freeze drying is well known in the food industry and a wide variety of freeze drying equipment is commercially available. The homogenized composition may be freeze dried alone or in the presence of a second component.

Fluidized bed dryers are also well-known in the food industry and may be purchased from a variety of suppliers. Generally, fluidized bed dryers allow one to spray a fluid that needs to be dried on a particulate carrier and to pass a drying gas (e.g., air or nitrogen) upwardly through a layer of the coated carrier. In one useful embodiment, the disclosed homogenized composition and the second component described above may be added to the fluidized bed. For example, the second component may comprise a suitably sized particulate starch and/or sweetener that is added to a lower part of the dryer. The homogenized composition may be sprayed onto the fluidized bed of the second component and dried together to form particles coated with the citrus pulp fiber and the lipid.

The relative percentages of the homogenized composition and the second component can be varied as needed. In one embodiment useful for the fluidized bed drying, the dry blend system includes 10-40 wt %, e.g., 15-35 wt %, of the homogenized composition (dried basis) and about 60-90 wt %, e.g., 65-85%, of the second component.

Gel-Based Dessert Systems

The disclosed preblends have been found particularly well-suited for use in gel-based dessert systems. The following discussion focuses on dairy-based pudding systems, but similar benefits are anticipated for other gel-based dessert systems, such as dairy and non-dairy (e.g., soy) yogurts and custards.

Conventional dairy pudding compositions typically include about 30-70 wt %, e.g., 35-45 wt %, milk or nonfat milk; 5-20 wt %, e.g., 10-15 wt %, added water; 0.05-30 wt % of a sweetener (with the lower end of this range commonly reserved for high-intensity sweeteners); 0.5-15 wt %, e.g., 0.5-10 wt %, of a shortening; 2-10 wt %, e.g., 3-8 wt % of a starch or other thickener; 0.05-2 wt %, e.g., 0.75-1.25 wt %, salt; 0.01-2 wt %, e.g., 0.05-1.5 wt %, of an emulsifier: 0.01-2 wt %, e.g., 0.02-1.25 wt %, of a colorant; and 0.05-2 wt %, e.g., 0.01-1.5 wt %, of a flavor. US Patent Application Publication No. US 2003/0044494, the entirety of which is incorporated herein by reference, discloses suitable colorants and describes a process for making dairy-based ready-to-eat (RTE) puddings.

The disclosed gel-based dessert systems may be have a similar composition to such conventional products, but some—desirably all—of the shortening may be replaced with citrus pulp fiber and an edible lipid, preferably a liquid oil as described above. In a preferred embodiment, the shortening is replaced with a combination of liquid oil and citrus pulp fiber that has been homogenized with water to form an emulsion and, optionally, dried to form a dry blend system before being combined with the other ingredients. As explained below in the examples, this can enhance viscosity while reducing the amount of saturated or trans fats in the dessert system.

In one embodiment, the gel-based dessert system is a dry blend system comprising citrus pulp fiber and an edible lipid, preferably an edible liquid oil as discussed above. This gel-based dessert system may also include additional dry ingredients that are useful in making the desired finished gel-based dessert product. For example, the dry blend system may also include one or more of a starch, a sweetener, nonfat milk powder, salt, a colorant, and a flavoring agent. In one exemplary embodiment, the dry blend system includes an edible liquid oil with SFC 0 of less than 5 wt %; citrus pulp fiber in a weight ratio of oil to citrus pulp fiber of about 2-15; a starch such as a modified corn starch; sweetener, preferably sucrose; nonfat dry milk powder, and suitable colorants and flavoring agents. Such a dry mix may be sold as a pudding mix that a consumer can prepare by adding milk and/or water and cooking the resultant food system in a conventional manner. To make an instant pudding dry blend system that avoids the necessity to heat the food system, the modified starch may be a pre-gelatinized starch.

One gel-based dessert system in accordance with this disclosure is a finished, ready-to-eat pudding product that is made using the disclosed preblend system. Such a pudding product may be freeze/thaw stable, preferably avoiding any visible coalescence of oil in the pudding product even after ten or more cycles of freezing and thawing. It also desirably has at least about 20 wt % water and has an apparent viscosity (see Example 2 below) of at least 10,000 mPa*s at 20° C. and 10 s$^{-1}$, e.g., at least 12,000 mPa*s at 20° C. and 10 s$^{-1}$. For example, the apparent viscosity may be 12,000-25,000 mPa*s at 20° C. and 10 s$^{-1}$, e.g., 14,000-20,000, mPa*s at 20° C. and 10 s$^{-1}$.

As explained above, the disclosed preblend system may be formed using a non-hydrogenated liquid oil that is low in trans and saturated fats, yet can effectively replace the partially hydrogenated and/or tropical oil shortenings conventionally used in making puddings. As a result, certain embodiments provide finished pudding products that are devoid of hydrogenated lipids, e.g., free of any partially hydrogenated oils, yet have desirably organoleptic qualities. Further embodiments provide finished pudding products that have an FDA saturates content of no more than 20%, preferably no more than 15%, e.g., no more than 10%, of the total fat content of the pudding composition.

Although the disclosed preblends are useful in gel-based dessert systems, they can be used in a wide array of other food systems. Exemplary food systems employing preblend systems of the disclosure include, but are not limited to, beverages such as alcoholic and non-alcoholic drinks, juices, dietary supplements and the like; dairy products such as ice cream, sour cream, coffee creamer (coffee whitener), cheese, and the like; non-dairy products such as imitation cheese, sorbet, sherbet, water ice, non-dairy based desserts, and the like; ready mixes; meat products; egg products; spreads; jams and preserves; icings; salad dressings; sauces; condiments; salsa; oil, mayonnaise, and the like. Other non-limiting suitable examples of food systems into which the preblend system of the present disclosure can be incorporated are as follows: juices and juice drinks, including condensed and ready to drink juices and instant juice drinks; milk, (dairy, soy, rice) and milk-based beverages (liquid and powdered); jams, jellies, preserves, and spreads; dips and salsas; nutritional beverages, shakes and meal replacements; ready to drink smoothies, shakes and meal replacements; alcoholic beverage mixes; fruit and savory snacks, candy, and confections; icings and other bakery fillings; sauces, salad dressings, and oils; coffee, coffee based beverages, and creamers (instant and liquid).

EXAMPLES

The following are examples of preblend systems and food systems containing various combinations of citrus pulp fiber and edible lipids that demonstrate the desirable characteristics discussed above. These examples are presented to illustrate the present disclosure and to assist one of ordinary skill in making and using the same. The examples are not intended in any way to otherwise limit the scope of the disclosure. For example, a number of the examples discuss dairy pudding systems, but they highlight advantages of the disclosed preblends that can be realized in other food systems, including such gel-based dessert systems as non-dairy puddings and dairy and non-dairy yogurts.

Example 1—Preblend System

This example describes certain useful preblend systems, including freeze-dried dry blend systems. A series of six combinations were prepared using different proportions of edible oil, citrus pulp fiber, and water, as set forth in Table 1. The oil was a high-oleic rapeseed oil commercially available from Cargill under the trademark CLEAR VALLEY 65, which has a SFC 0 of less than 5 wt %, less than 3% trans fat and less than 15% FDA saturates. The citrus pulp fiber (designated "CPF" in Table 1) was prepared in accordance with the processes described in United States Patent Application Publication No. US 2006/0115564.

TABLE 1

| Sample | Emulsion (wt %) | | | Solids Basis (wt %) | | Observations |
| --- | --- | --- | --- | --- | --- | --- |
| No. | Oil | CPF | Water | Oil | CPF | |
| 1.1 | 0 | 1 | 99 | 0 | 100 | Acceptable |
| 1.2 | 5 | 1 | 94 | 83 | 17 | Acceptable |
| 1.3 | 10 | 1 | 89 | 91 | 9 | Acceptable |
| 1.4 | 15 | 1 | 84 | 93.75 | 6.25 | Some oil coalescence upon drying |
| 1.5 | 20 | 1 | 79 | 95 | 5 | Phase separation upon drying |
| 1.6 | 25 | 1 | 74 | 96 | 4 | Phase separation upon drying |

Procedure: The citrus pulp fiber and water were mixed together using a mechanical stirrer (IKA RW 28, available from IKA-Werke GmbH & Co. KG of Staufen, Germany) until no lumps were visible. The oil was gradually added while mixing with a T25 Ultra-Turrax homogenizer (also available from IKA-Werke) with a S25N-25F attachment. Mixing continued until the combination reached a smooth consistency. This combination of oil, CPF, and water was then homogenized using a High-Pressure Valve Homogenizer (MINI-LAB 8.30H, available from APV Rannie AS of Albertslund, Denmark) at about 3,000 psi. This yielded a water-in-oil emulsion, which was freeze-dried using an ALPHA 2-4 freeze dryer to form a dry blend system (available from Martin Christ Gefriertrocknungsanlagen GmbH of Osterode am Harz, Germany). Some of the samples were also cryo-milled to obtain a fine powder for easy handling.

Samples 1.1-1.3 all yielded visually acceptable, apparently stable products. Sample 1.1 did not include any oil, but Samples 1.2 and 1.3 yielded dry blend systems having oil to citrus pulp fiber weight ratios of 5:1 and 10:1, respectively. Sample 1.4, which had about 15 grams of oil per gram of citrus pulp fiber, was at least marginally acceptable, but some of the oil coalesced when it was dried. Samples 1.5 and 1.6, which had oil to citrus pulp fiber weight ratios of 20:1 and 25:1, respectively, exhibited phase separation on drying, yielding a commercially undesirable dry blend system. Surprisingly, at least marginally acceptable dry blend systems were obtained even using oil contents that exceeded the OBC of the citrus pulp fibers, which was no greater than about 10 g of oil per g of citrus pulp fiber as determined using the method set forth above.

Example 2—Pudding Systems

A dairy pudding, namely a ready to eat (RTE) finished pudding, prepared with one of the dry blend systems of Example 1 was compared to three other formulations. All four of the formulations had the same basic formula shown in Table 2, but differed in terms of the nature of the fat component. In particular, the fat component of a first formulation (Pudding 2A) was a conventional vegetable bakery shortening sold under the trade name GOLD CUP by Vandemoortele NV of Gent, Belgium. The fat component in a second formulation (Pudding 2B) was CLEAR VALLEY 65 canola oil. The fat component in a third formulation (Pudding 2C) was the dry blend system produced as sample 1.3 in Example 1. The fat component in the fourth and final formulation (Pudding 2D) was 10 parts by weight CLEAR VALLEY 65 canola oil for each part of the same citrus pulp fiber used in Example 1, but these components were added separately rather than forming a dry blend system following the process of Example 1.

TABLE 2

| Ingredient | Weight (g) | (%) |
| --- | --- | --- |
| Water | 343.0 | 68.6% |
| Skimmed sweetened condensed milk | 42.5 | 8.5% |
| Salt | 1.3 | 0.3% |
| Sugar | 71.0 | 14.2% |
| Sodium Stearoyl Lactylate[1] | 0.7 | 0.1% |
| Modified Food Starch[2] | 25.0 | 5.0% |
| Fat Component | 16.5 | 3.3% |
| Total | 500.0 | 100.0% |

[1] the sodium steroyl lactylate was a commercially available product from Danisco A/S of Copenhagen, Denmark
[2] sold by Cargill under the designation C★06219

Pudding Preparation: A cold premix was prepared by mixing the condensed milk and 90% (308.8 g) of the water, then adding the salt, sugar, and starch. A hot premix was prepared by adding sodium steroyl lactylate to the fat component while mixing at a low speed for 5 minutes at using an IKA-Werke mixer at 500 rpm. The shortening used in Pudding 2A was heated to a temperature of 50° C. for 10 minutes using a double-jacketed vessel before adding the sodium steroyl lactylate. The speed of the mixer was increased to 700 rpm and the remaining 10% (34.3 g) of the water was added as the mixture was heated to 70° C. for 10 minutes. Puddings 2A and 2B (without any citrus pulp fiber) were then homogenized at 50 bar using the MINI-LAB 8.30H homogenizer of Example 1; Puddings 2C and 2D (which did include citrus pulp fiber) were not homogenized. The cold premix and the hot premix where mixed together and heated to 90° C. for 5 minutes using a double-jacketed vessel. A 30 ml portion of each resultant pudding was placed in a separate 50 ml measuring cylinder for freeze-thaw stability testing; the remainder of each pudding was cooled down and stored in a refrigerator overnight before its viscosity was measured.

Freeze-Thaw Stability: The four measuring cylinders of finished puddings were stored overnight (17:00-09:00) at −18° C. and allowed to thaw at 20° C. during the day (09:00-17:00) for up to 10 cycles. Each day, the four pudding formulations were inspected to see whether any oil droplets were visible in the pudding. Pudding 2b, which included only the canola oil, had poor freeze-thaw stability and testing was stopped after visible oil droplets were observed on the third day. The other three samples did not develop any visible oil droplets over the 10-day test period. This is consistent with the general understanding in the art that food systems including liquid oils with low solid fat content (e.g., less SFC 0 of less than 5 as in the second pudding) instead of a shortening (as in the first pudding) generally produce commercially undesirable finished puddings.

Viscosity Measurement: The apparent viscosity of each of the four puddings was measured with a Physica MCR300 rheometer (available from Physica Messtechnik GmbH of Stuttgart, Germany) using starch cell geometry. The temperature was set at 20° C. and the shear rate varied between 0.1 to 100 $s^{-1}$. At a shear rate of 10 $s^{-1}$, the apparent viscosities measured for the four pudding formulations were as follows: Pudding 2A (vegetable shortening) had an apparent viscosity of 14,530 mPa*s; Pudding 2B (canola oil only) had an apparent viscosity of 13,300 mPa*s; Pudding 2C (dry blend system of Example 1) had an apparent viscosity of 25,620 mPa*s; and Pudding 2D (canola oil and citrus pulp fiber added as separate ingredients) had an apparent viscosity of 19,570 mPa*s.

These results are interesting in several respects. First, the apparent viscosity of the pudding containing the liquid oil only was lower than that of the conventional shortening-based pudding and may be expected to yield a less desirable mouth feel. Pudding 2D, which included citrus pulp fiber and oil without first forming a dry blend, yielded a noted increase in apparent viscosity in comparison with both of the first two pudding formulations. Pudding 2C, which included the preblend system prepared in Example 1, had essentially the same composition as Pudding 2D, but yielded an apparent viscosity measurement that was over 30% higher.

This demonstrates that a preblend system in accordance with this disclosure that includes a liquid oil and citrus pulp fiber can yield unexpected increases in viscosity in food systems, e.g., gel-based dessert systems. This may, in turn, allow food manufacturers to reduce the fat content of gel-based dessert systems without sacrificing viscosity or to reduce or even eliminate other viscosity enhancing agents in gel-based dessert systems, potentially cutting cost and/or reducing the number of ingredients they have to list on the product label. This experiment also demonstrates that dry blend systems in accordance with this disclosure may be used as a structured fat system to replace vegetable shortenings and other plastic fats in gel-based dessert systems.

Example 3—Alternative Dry Blend System

This example describes certain useful preblend systems, including dry blend systems prepared using a fluidized bed dryer. For each of four tests, a wet blend system was prepared using citrus pulp fiber, edible oil, and water. The oil was a high-oleic rapeseed oil commercially available from Cargill under the trademark CLEAR VALLEY 75, which has a SFC 0 of less than 5 wt %, less than 3% trans fat and less than 15% FDA saturates. The citrus pulp fiber is commercially available from Fiberstar, Inc. of Willmar, Minn., USA under the trade name CITRI-FI 100M40. This wet blend system was then dried in a fluidized bed using varying amounts of a particulate starch as a carrier as set forth in Table 3. In each case, the particulate carrier was about 40 wt % POLARTEX 05735 and about 60 wt % POLARTEX 06754, both of which are modified food starches commercially available from Cargill.

TABLE 3

| | Fluidized Bed Drying | | | Dried System | | | |
|---|---|---|---|---|---|---|---|
| Sample No. | Emulsion (g) | Polartex 05735 (g) | Polartex 06754 (g) | Oil (wt %)* | CPF (wt %) | Water (wt %)* | Starches (wt %) |
| 3.1 | 2000 | 399.96 | 599.94 | 31 | 3.1 | 3.66 | 62.24 |
| 3.2 | 2000 | 527.22 | 790.83 | 25 | 2.5 | 5.21 | 67.29 |
| 3.3 | 2000 | 709.02 | 1063.53 | 20 | 2.0 | 4.75 | 73.25 |
| 3.4 | 2000 | 1012.02 | 1518.03 | 15 | 1.5 | 4.07 | 79.43 |

*Measured values

Procedure: Four 2,000 g batches of the wet blend system were prepared. For each batch, 45.5 g of the citrus pulp fiber was mixed with 1500 g of water with a laboratory mechanical stirrer (Silverson Machines, Inc. of East Longmeadow, Mass., US) until no lumps were present. Then, 454.5 g of the canola oil was added while stirring; stirring continued until a smooth consistency was obtained. This combination was then homogenized using a High-Pressure Valve Homogenizer (MINI-LAB 8.30H, available from APV Rannie AS of Albertslund, Denmark) at about 3,000 psi, producing a water-in-oil emulsion having about 75 wt % water and a weight ratio of oil to citrus pulp fiber of about 10:1.

Each of these emulsions was dried in a fluidized bed dryer by spraying it on a different amount of the particulate starch carrier in the proportions set forth in Table 3. The inlet temperature of the dryer was about 30-50° C., the outlet temperature was about 60-70° C., and the pump was operated at 12 U/1.5 bar. The compositions of the four resultant dry blend systems are set forth in Table 3.

Each of the four samples in this experiment yielded a flowable dry blend system.

Example 4—Pudding Systems Employing Dry Blend System from Example 3

An RTE dairy pudding prepared with one of the dry blend systems produced in Example 3 was compared to two other formulations. The formulations are described in Table 4 below.

TABLE 4

| Ingredients | Pudding 4A (wt %) | Pudding 4B (wt %) | Pudding 4C (wt %) |
|---|---|---|---|
| Skim milk | 40.00 | 40.00 | 40.00 |
| Added water[1] | 37.55 | 38.68 | 37.99 |
| Sodium Stearoyl Lactylate[2] | 0.10 | 0.10 | 0.10 |
| Dry blend system[3] | | | 8.37 |
| PA37 shortening | 3.30 | | |
| CLEAR VALLEY 75 canola oil | | 2.18 | |
| Salt | 0.26 | 0.26 | 0.26 |
| Potassium sorbate | 0.05 | 0.05 | 0.05 |
| POLARTEX 05735 | 2.20 | 2.20 | |
| POLARTEX 06754 | 3.30 | 3.30 | |
| 1844 Calcium carbonate | 0.13 | 0.13 | 0.13 |
| Vanilla VM01 | 0.10 | 0.10 | 0.10 |
| Sugar | 13.00 | 13.00 | 13.00 |
| Citrus pulp fiber[4] | | 0.22 | |

[1]Differences in moisture content in the varied ingredients were compensated by the amount of added water.
[2]EMPLEX brand from CJ Patterson Company of Kansas City, Missouri, USA
[3]Sample No. 3.1 from Example 3, above
[4]CITRI-FI 100M40 brand from Fiberstar, Inc. of Willmar, Minnesota, USA Pudding Preparation: All of the dry ingredients to the water at 20° C. while mixing with an IKA-Werke mixer at 500 rpm. This mixture was then heated to 52° C. using a double-jacketed vessel while continuing to stir at the same speed. The fat component was then added while continuing to stir. The fat composition in Pudding 4A was the PA37 shortening, which was melted at 50° C. prior to addition; the fat composition in Pudding 4B was the CLEAR VALLEY 75 canola oil; and the fat composition in Pudding 4C was the dry blend system sample number 3.1 from Experiment 3. The composition was heated to 85° C. using the same double-jacketed vessel and held at that temperature for 5 minutes. Portions of each resultant pudding were placed in separate cups and allowed to cool to room temperature prior to storing in a refrigerator.

Evaluation: The force needed to penetrate the surface of each pudding was measured using a TA.XTplus brand texture analyzer, sold by Stable Micro Systems, Ltd. Of Surrey, England. The analyzer was fitted with a cylinder spindle probe with a diameter of 20 mm. The probe penetrated the sample for about 20 mm at a speed of 1 mm/sec and the requisite force was recorded. The trigger force was set at 10 g. The sample temperature during the measurement was 20° C. Table 5 lists the measured forces.

TABLE 5

| Pudding | Force Measured (g) |
|---|---|
| 4A | 48.8 |
| 4B | 54.5 |
| 4C | 69.65 |

These results are comparable to the results of Example 2 above. The conventional, shortening-based Pudding 4A had the lowest viscosity of the three samples. The viscosity of Pudding 4B, in which the oil and citrus pulp fiber were added separately, was more than 10% higher than that of Pudding 4A, demonstrating that a gel-based dessert system in accordance with embodiments of the invention can achieve comparable or superior performance to conventional formulations without the trans fat or saturated fat shortcomings of shortenings. Pudding 4C, employing a dry blend system in accordance with a further embodiment of the invention, was even more viscous, with a viscosity measurement over 40% higher than that of Pudding 4A. This again highlights the remarkable improvement in viscosity over a) a conventional shortening formulation pudding system using shortening, and even more surprisingly, b) an alternative citrus pulp fiber-based embodiment in which the oil and citrus pulp fiber are added separately instead of being homogenized with water to form a preblend system before mixing with the other ingredients.

At numerous places throughout this specification, reference has been made to a number of U.S. patents, published foreign patent applications and published technical papers. All such cited documents are expressly incorporated in full into this disclosure as if fully set forth herein.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a protein" includes two or more different proteins. As used herein, the term "include" and its grammatical variants are intended to be non-limiting, such that recitation of items in a list is not to the exclusion of other like items that can be substituted or added to the listed items.

It is also noted that the headings as used in this specification are purely for organizational purposes and are intended to be non-limiting, such that recitation of items under a heading is not to the exclusion of other like items that can be substituted or added to the items discussed therein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Applicants do not intend to dedicate any disclosed embodiments to the public, and to the extent any disclosed modifications or alterations may not literally fall within the scope of the claims, they are considered to be part of the invention under the doctrine of equivalents.

What is claimed is:

1. A method of forming a food product, comprising:
homogenizing a combination consisting of citrus pulp fiber, an edible lipid, and water to form a homogenized combination that includes 1-20 parts by weight of the lipid for each part by weight of citrus pulp fiber, wherein homogenization is carried out using high pressure valve homogenization and wherein the homogenized combination is a water-in-oil emulsion; and
drying the homogenized composition to form a dry blend system; and
mixing the dry blend system with a sweetener, a starch, and at least one of water or milk to form a finished gel-based dessert product that comprises at least about 20 wt % water and has a viscosity of at least about 20,000 mPa*s at 20° C. and 10 $s^{-1}$.

2. The method of claim 1 wherein drying the homogenized composition comprises drying the homogenized composition in the presence of a further ingredient.

3. The method of claim 1 wherein drying the homogenized composition comprises drying the homogenized composition in the presence of at least one of a starch and a sweetener.

4. The method of claim 1 wherein drying the homogenized composition comprises adding the homogenized composition and at least one of a starch and a sweetener to a fluid bed dryer.

5. The method of claim 1 wherein the citrus pulp fiber has a water binding capacity of from about 7 g of water to about 25 g of water per gram of citrus pulp fiber, and an oil binding capacity of from about 1.5 g of oil to about 10 g of oil per gram of citrus pulp fiber.

* * * * *